United States Patent

Hendrickson et al.

[11] Patent Number: 5,839,061
[45] Date of Patent: Nov. 17, 1998

[54] RECEIVER QUALITY MEASUREMENT SYSTEM FOR USE IN DIGITAL CORDLESS TELEPHONES AND LIKE APPARATUS

[75] Inventors: Alan F. Hendrickson; Joseph W. Peterson, both of Austin, Tex.

[73] Assignee: Advanced Micro Devices, Inc., Sunnyvale, Calif.

[21] Appl. No.: 531,049

[22] Filed: Sep. 20, 1995

Related U.S. Application Data

[63] Continuation of Ser. No. 191,994, Feb. 4, 1994, abandoned.

[51] Int. Cl.⁶ ........................................... H04B 1/10
[52] U.S. Cl. ................... 455/296; 455/226.2; 455/226.3; 375/346
[58] Field of Search ................ 455/226.1, 226.2, 455/226.3, 295, 296, 303, 304, 305, 67.4, 266; 375/346, 349, 350

[56] References Cited

U.S. PATENT DOCUMENTS

| | | | |
|---|---|---|---|
| 4,910,794 | 3/1990 | Mahany | 455/67.4 |
| 5,070,536 | 12/1991 | Mahany et al. | 455/67.4 |
| 5,230,077 | 7/1993 | Raith | 455/296 |
| 5,239,683 | 8/1993 | Usui | 455/296 |
| 5,268,933 | 12/1993 | Averbuch | 455/54.1 |
| 5,287,556 | 2/1994 | Cahill | 455/266 |
| 5,396,657 | 3/1995 | Jokinen | 455/307 |
| 5,428,601 | 6/1995 | Owen | 435/437 |

FOREIGN PATENT DOCUMENTS

| | | |
|---|---|---|
| 0353759 A2 | 2/1990 | European Pat. Off. . |
| 0580341 A2 | 1/1994 | European Pat. Off. . |
| 0581477 A1 | 2/1994 | European Pat. Off. . |

Primary Examiner—Edward F. Urban
Attorney, Agent, or Firm—Jenkens & Gilchrist, P.C.

[57] ABSTRACT

A communication circuit designed to be coupled to a radio receiver so as to receive a data signal and a receive signal strength indicator signal indicative of radio carrier strength therefrom, and further designed to be coupled to a controller, the communications circuit including a first, second, third, and fourth subcircuit. The first subcircuit receives the receive signal strength indicator from the receiver, determines radio carrier strength therefrom, and transfers the determined strength information to the controller. The second subcircuit receives the data signal from the receiver, determines if there are bit error within that signal, and transfers its determinations to the controller. The third subcircuit receives the data signal from the receiver, determines if there is jitter therein, and transfers its determinations to the controller. The fourth subcircuit is coupled to the second and third subcircuits to receive the output thereof, and is further coupled to the controller so as to receive output therefrom, the fourth subcircuit acting in response to the outputs to suppress signal noise.

9 Claims, 1 Drawing Sheet

RECEIVER QUALITY MEASUREMENT SYSTEM FOR USE IN DIGITAL CORDLESS TELEPHONES AND LIKE APPARATUS

This application is a continuation of application Ser. No. 08/191,994, filed on Feb. 4, 1994, which was abandoned upon the filing hereof.

BACKGROUND OF THE INVENTION

1. Field of the Invention

The present invention relates to circuitry for use in communications systems. More particularly, the present invention relates to receiver quality measurement circuitry for use in digital communications systems.

2. Description of Related Art

Digital cordless telephones offer crystal clear, static-free voice connection. Furthermore, digital telephones having microcontrollers can be designed to detect degradation of signal quality and to react to such degradation by, for example, automatically switching to another channel. Reasons the radio environment may become poor include interference from other telephones and electronic devices, movement of the cordless telephone handset beyond the range of the basestation, physical blocking by walls, and so forth, as well as random events known as "fades". Because of the foregoing, virtually all digital cordless telephones on the market today employ some kind of receiver quality measurement circuitry. Such circuitry generally includes a cyclic redundancy check (CRC) checker and another "quality" measurement, typically related to jitter. These prior art receiver quality measurement systems have a number of shortcomings and disadvantages. One shortcoming and deficiency is minimal, if any, reliance on software intervention. Software intervention can be valuable because it can allow designers to write proprietary algorithms which differentiate one product from another. Product differentiation, in turn, can contribute to product goodwill and value. Secondly, prior art receiver quality measurement circuits fail to offer enough tools to allow engineers to design proprietary quality monitors. Once again, this is a shortcoming and deficiency that restricts development of product goodwill and enhanced market value. Many present day communications devices other than digital cordless telephones suffer similar shortcomings and deficiencies.

SUMMARY OF THE INVENTION

The present invention overcomes the shortcomings and deficiencies discussed above by providing a communication circuit designed to be coupled to a radio receiver so as to receive a data signal and a receive signal strength indicator (RSSI) signal indicative of radio carrier strength therefrom, and further designed to be coupled to a controller. According to the teachings of the present invention, such a communications circuit includes a first, second, third and fourth subcircuit. The first subcircuit receives the RSSI signal from the receiver, determines radio carrier strength therefrom, and transfers the determined strength information to the controller. The second subcircuit receives the data signal from the receiver, determines if there are bit errors within that signal, and transfers its determinations to the controller. The third subcircuit receives the data signal from the receiver, determines if there is jitter therein, and transfers its determinations to the controller. The fourth subcircuit is coupled to the second and third subcircuits to receive the output thereof, and is further coupled to the controller so as to receive output therefrom. The fourth subcircuit acts in response to the received outputs to suppress signal noise.

Accordingly, an object of the present invention is to provide an improved receiver quality measurement system for digital cordless telephones and like apparatus.

Another object of the present invention is to provide a tool that can be used by engineers to design proprietary quality monitors.

Yet another object of the present invention is to allow designers to write and employ proprietary algorithms which can differentiate one particular communications product from another.

BRIEF DESCRIPTION OF THE DRAWINGS

For a more complete understanding of the present invention, and for further objects and advantages thereof, reference may now be had to the following detailed description of the invention taken in conjunction with the accompanying drawings wherein.

DETAILED DESCRIPTION OF A PREFERRED, EXEMPLARY EMBODIMENT OF THE PRESENT INVENTION

To facilitate understanding of the present invention, it will be described herein in the form of a subcomponent of a logic module in an integrated circuit (IC). A particular application incorporating the IC, a cordless telephone application, will also be described. Such a discussion is particularly useful for those skilled in the art because an embodiment of the present invention like that described has been actually constructed and used with outstanding results. It should be kept in mind, however, that the invention described herein is not limited to cordless telephone applications. To the contrary, embodiments of the present invention may be employed in virtually any application requiring or improved by having a receiver quality measurement system. The particular embodiments of the present invention described herein are exemplary only.

Figure 1:
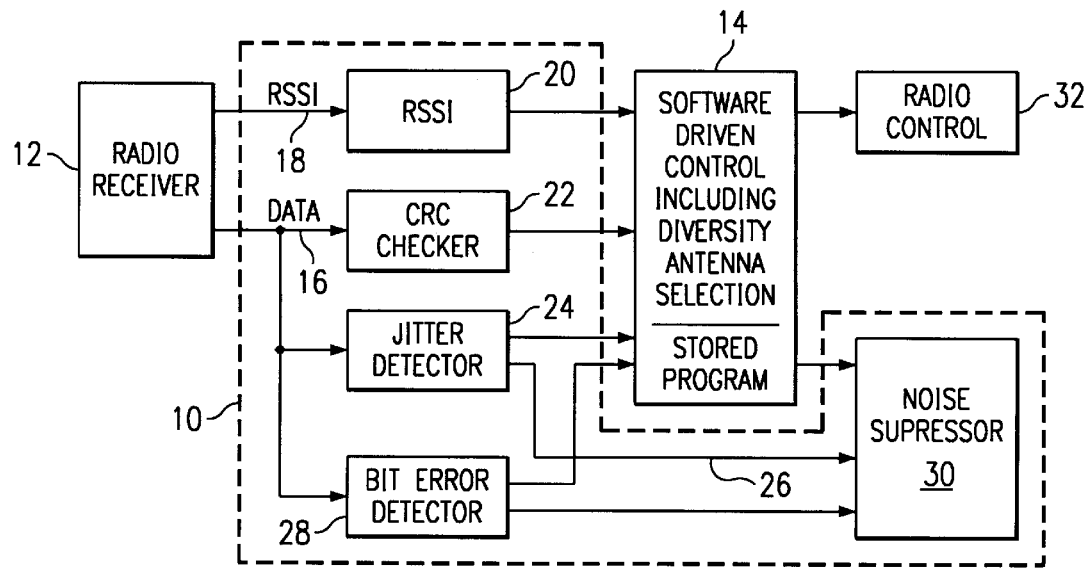
FIG. 1 is a block diagram of a preferred exemplary embodiment of the present invention.

Referring now to the drawings wherein like or similar elements are designated with identical reference numerals throughout the several views and, more particularly, to FIG. 1, there is shown a block diagram of a preferred exemplary embodiment of the present invention (generally designated by reference numeral 10), enclosed in a dotted line, in a digital cordless telephone application. Outside the dotted line, and interacting with the system 10 as discussed hereinbelow, are a radio receiver 12, software driven control 14, and a radio control 32. The receiver 12 recovers digital data from an antenna which has been transmitted in such a way as to be meaningful to the receiver 12. The outputs of the radio receiver 12 are a serial stream of binary digits (transmitted on the line 16 depicted in FIG. 1) and an analog signal (transmitted on the line 18 in FIG. 1) representing the relative strength in decibels of the radio carrier, called RSSI (the receive signal strength indicator). The data stream is roughly synchronous, with a new data bit evaluated at a periodic rate; however, data may be corrupted and the timing may vary in response to a number of parameters.

The RSSI signal is routed to a circuit (designated with reference numeral 20 in FIG. 1) which interprets the input in such a way that the software driven control 14 can determine the strength of the radio carrier frequency. For example, distant units would have low strength relative to closely located units.

The CRC (Cyclic Redundancy Check) checker (designated with reference numeral 22 in FIG. 1) merely determines if bit errors occurred in a certain field of the received data, to which has been appended a CRC code. CRC's are very common in data communication, and this is merely a conventional one. The CRC checker 22 generates an indicator to the software driven controller 14 whenever the CRC evaluation concludes that a bit error occurred. Software can then use this information to track general receiver quality. Extrapolating the receiver quality of all fields can be fairly represented by the quality of this one field.

The jitter detector (designated with reference numeral 24 in FIG. 1) attempts to align an internal copy of the data bit timing with the observed data bit timing from the receiver 12. Ideally, the observed data timing ought to be fixed, but it will likely be degraded in actuality such that data transitions occur before or after expected data transitions. This often happens because of poor radio environments and because of compromises made in the methods by which data transitions are recovered in the radio receiver 12. The internal timing is allowed to vary only slightly from the ideal, and it therefore becomes a reference timing signal. Once the internal timing is aligned with the actual data timing, the instantaneous difference in time between the internal (reference) and actual timing is known as jitter. Jitter negatively affects receiver performance because it may result in binary decision errors. The particular jitter detector employed in the preferred exemplary embodiment of the present invention is described in detail in various of the co-pending applications referenced below and incorporated herein by reference. In general, this detector 24 creates a symmetric window around the expected (reference) data transition timing and accumulates occurrences of data transitions outside of this window of tolerance. The size of the window is programmable by software to allow many degrees of resolution. When a sufficient number of occurrences accumulate, a trigger is submitted to the software driven controller 14, which can respond according to its programming. The number which determines "sufficient" is also programmed by software. The jitter detector 24 also has an output (transmitted on the line 26 in FIG. 1) which propagates to a noise suppression block which will be discussed further hereinbelow.

The preferred exemplary embodiment of the present invention depicted in FIG. 1 may also be seen to include a bit error detector 28. The bit error detector 28 detects bit errors in the voice field which is not equipped with a CRC. Detection is done using digital signal processing techniques to determine if a voice signal reconstructed using the received data does indeed have the electrical characteristics of human speech. If not, the bit error detector 28 concludes that the data must be erroneous, and it issues an indicator to the software driven controller 14 and also to the noise suppression block 30 mentioned above and described further immediately below.

The noise suppression block 30 is an execution unit, responsive to the jitter detector 24, the bit error detector 28, and the software driven controller 14. It may be configured to respond to any combination of these three elements. Its job is to mute the received voice such that the listener does not get an earful of noise, which could be potentially a full-scale screaming noise. The reason the jitter and bit error detector inputs go straight to the noise suppressor 30 in the preferred exemplary embodiment of the present invention is to provide a very-fast reaction should the software driven controller 14 have a response that is too slow.

The software driven controller 14 includes a program executed in a microcontroller responsive to all the indicators mentioned hereinabove. It determines the radio controller's operating parameters, such as the radio channel or antenna diversity control (antenna diversity is a trick used to improve receivers by choosing one of two antennae located far enough apart that they both cannot be physically located in a null, a null be a location where radio waves cancel to near zero due to interference or bouncing off walls, etc.). The program executed by the controller 14 may also participate in directing the behavior of the noise suppression block 30, which may include configuring the block to respond only to jitter and/or bit error triggers or which may be complete software control of all noise suppression operation. Based upon all of its inputs, the software driven control 14 acts as programmed and controls a radio control (designated with reference numeral 32 in FIG. 1) via output.

Figure 2:
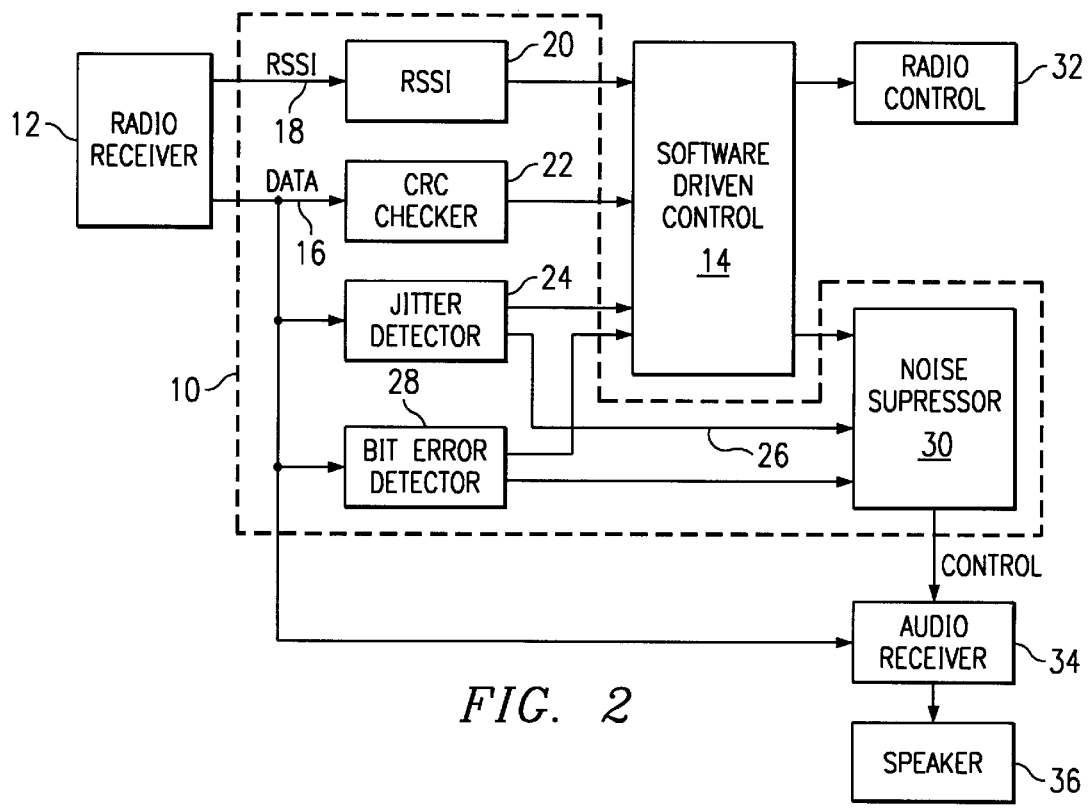
FIG. 2 is a block diagram of an alternative preferred exemplary embodiment of the present invention.

Referring now to FIG. 2, there is shown a block diagram of an alternative preferred exemplary embodiment of the present invention. The embodiment depicted in FIG. 2 differs from the one depicted in FIG. 1 insofar as it includes structure for interfacing with an audio receiver 34. As shown in FIG. 2, the audio receiver 34 receives data from the receiver 12 and a control signal from the noise suppressor 30. Thus, data enters the audio receiver 34, is affected by control input from the noise suppressor 30, and outputs a voice signal to a speaker 36.

One possible application of the present invention is, as has been stated, an integrated circuit for a cordless telephone handset and base unit, for example, such as the integrated circuit disclosed in co-pending, commonly assigned applications Ser. Nos. 07/917,497, U.S. Pat. No. 5,448,945; Ser. No. 07/917,489, U.S. Pat No. 5,408,693; Ser. No. 07/917,488, U.S. Pat. No. 5,731,738; Ser. No. 07/918,627, U.S. Pat. No. 5,555,287; Ser. No. 07/918,626, now abandoned; Ser. No. 07/918,625, now abandoned; Ser. No. 07/918,624, U.S. Pat. No. 5,404,459; Ser. No. 07/918,631, U.S. Pat. No. 5,495,530; Ser. No. 07/918,632; 07/918,622, U.S. Pat. No. 5,502,689; and Ser. No. 07/918,621, U.S. Pat. No. 5,420,904, each filed on Jul. 21, 1992, which disclosure is incorporated herein by reference.

Based upon all of the foregoing, it should be understood and appreciated that the present invention provides an extremely comprehensive receiver quality measurement circuit. As previously mentioned, prior art receiver quality measurement circuits generally contain only a CRC checker and another "quality" measurement, usually related only to jitter. The present invention masterfully incorporates software intervention into apparatus such as digital cordless telephones. It allows designers to write proprietary algorithms which differentiate their products from other products, even those using the same chip with different software. In a world of standardization, product differentiation is very important to manufacturers.

As is clearly seen, the present invention is a significant improvement in the art. The present invention is believed to be especially effective when configured and employed as described herein, however, those skilled in the art will readily recognize that numerous variations and substitutions may be made in the invention and its use and configuration to achieve substantially the same results as achieved by the embodiments and, in particular, the preferred embodiment expressly described herein. Each of those variations is intended to be included in the description herein and forms a part of the present invention. The foregoing detailed description is, thus, to be clearly understood as being given by way of illustration and example only, the spirit and scope of the present invention being limited solely by the appended claims.

What is claimed is:

1. A communication circuit designed to be coupled to a radio receiver so as to receive a data signal and a receive signal strength indicator signal indicative of radio carrier strength therefrom, and further designed to be coupled to a controller, said communications circuit comprising:

a first subcircuit that receives said receive signal strength indicator, determines radio carrier strength therefrom, and transfers its determinations to said controller for processing;

a second subcircuit that receives said data signal from said receiver, determines if there are bit errors within that signal, and transfers its determinations to said controller for processing;

a third subcircuit that receives said data signal from said receiver, determines if there is jitter therein, and transfers its determinations to said controller for processing; and a fourth subcircuit that is coupled to said second and third subcircuits to receive the output thereof, and which is further coupled to said controller so as to receive processing output therefrom, said fourth subcircuit acting in response to the outputs from the second and third subcircuits and the output from the controller to suppress noise within the data bandwidth of the received data signal.

2. A communications circuit as recited in claim 1, further comprising a fifth subcircuit that receives said data signal from said receiver, performs a cyclic redundancy check, and transfers its check results to said controller.

3. A communications circuit as recited in claim 1, wherein said communications circuit is further coupled to an audio receiver, and wherein said audio receiver receives said data signal from said receiver, and wherein said audio receiver further receives a control signal output by said fourth subcircuit.

4. A communications circuit as recited in claim 1, wherein said communications circuit is incorporated into a digital cordless telephone.

5. The communications circuit as in claim 1 further comprising a software routine executed by the controller for selecting among and between the determinations output by the first, second and third subcircuits and, in response thereto, processing said selected determinations to generate the output from the controller, said output designating a noise suppression operation to be acted on by the fourth subcircuit to suppress noise in the received data signal.

6. A method for processing a received data communications signal, comprising the steps of:

measuring the signal strength of the data communications signal and generating a signal strength output signal indicative thereof;

measuring jitter in the data communications signal and generating a jitter output signal indicative thereof;

identifying bit errors in the data communications signal and generating a bit error output signal indicative thereof;

processing the signal strength, jitter and bit error output signals by selectively processing among and between said output signals responsively, for processing the selected output signals to designate a noise suppression operation to be performed on the data communications signal; and suppressing noise within the data bandwidth of the data communications signal in accordance with the designated noise suppression operation and further in response to the jitter and bit error output signals.

7. The method as in claim 6 further including the step of processing the signal strength, jitter and bit error output signals to control communications system operation parameters including the selection of a radio channel and antenna diversity for broadcasting the data communications signal.

8. Apparatus for processing a received data communications signal, comprising:

a received signal strength indicator circuit for measuring the signal strength of the data communications signal and for generating a signal strength trigger signal indicative thereof;

a jitter detection circuit for measuring jitter in the data communications signal and for generating a jitter trigger signal indicative thereof;

a bit error rate circuit for identifying data errors in the data communications signal and for generating a bit error trigger signal indicative thereof;

a control circuit connected to receive the signal strength, jitter and bit error trigger signals and including means for processing said trigger signals by selectively considering for processing among and between said trigger signals and response to processing of the selected trigger signals generate a suppression signal designating a noise suppression operation to be performed on the data communications signal; and a noise suppression circuit connected to receive the suppression, jitter trigger and bit error trigger signals and including means for suppressing noise in the data communications signal in accordance with the designated noise suppression operation and further in response to the jitter and bit error trigger signals.

9. The apparatus as in claim 8 wherein the control circuit further includes means for processing the trigger signals to control operation of a radio frequency data communications system within which the apparatus is installed including the selection of a radio channel and antenna diversity for broadcasting the data communications signal.

* * * * *

UNITED STATES PATENT AND TRADEMARK OFFICE
CERTIFICATE OF CORRECTION

PATENT NO. : 5,839,061
DATED : November 17, 1998
INVENTOR(S) : Hendrickson et al.

Page 1 of 3

It is certified that error appears in the above-identified patent and that said Letters Patent is hereby corrected as shown below:

Column 1,
Line 8, please add the following:
CROSS-REFERENCE TO RELATED APPLICATIONS
This application is related to the following U.S. patent applications:

| SERIAL NO. | TITLE | INVENTOR(S) |
|---|---|---|
| 07/917,497 | General I/O Port Interrupt Mechanism | Gulick, et al. |
| 07/917,489 | Improved External Memory Access Control for a Processing Unit | Gulick, et al. |
| 07/917,488 | Method of Weak Pull-up Disable and Mechanism Therefor for Use with Microcontroller in Integrated Circuit and Cordless Telephone Using the Integrated Circuit | Bowles, et al. |
| 07/917,503 | Interrupt Mask Disable Circuit and Method | Bowles, et al. |
| 07/918,627 | Integrated Circuit and Cordless Telephone Using the Integrated Circuit | Gulick, et al. |
| 07/918,626 | Modulator Test System | Peterson et al. |
| 07/918,625 | Keypad Scanner Process and Device and Cordless Telephone Employing the Mechanism | Gulick |
| 07/918,624 | Serial Interface Module and Method | Gulick, et al. |
| 07/918,631 | Low Power Emergency Telephone Mode | Peterson, et al. |

UNITED STATES PATENT AND TRADEMARK OFFICE
CERTIFICATE OF CORRECTION

PATENT NO. : 5,839,061
DATED : November 17, 1998
INVENTOR(S) : Hendrickson et al.

It is certified that error appears in the above-identified patent and that said Letters Patent is hereby corrected as shown below:

| | | |
|---|---|---|
| 07/918,632 | In-Circuit Emulation Capability Mode in Integrated Circuit and Cordless Telephone Using the Integrated Circuit | Gulick, et al. |
| 07/918,622 | Clock Generator Capable of Shutdown Mode and Clock Generation Method | Peterson, et al. |
| 07/918,621 | Signal Averager | Gulick |
| 08/192,007 | Power Management Circuit for Use in Digital Cordless Telephones and Like Apparatus | Hendrickson, et al. |
| 08/191,949 | Apparatus and Method for Sending Signal Data | Schizlein, et al. |
| 08/191,940 | Burst Synchronization of Time Division Multiplexed Transceiver Pairs | Schnizlein |
| 08/192,046 | Dual-Mode Baseband Controller for Radio-Frequency Interfaces Relating to Digital Cordless Telephones | Hendrickson |
| 08/192,057 | Method and Apparatus for External Intermediate Data Processing | Mullins, et al. |
| 08/192,009 | Metal Programmed Transistor Array | Allee |
| 08/191,948 | Input/Output Data Port and Method | Mullins, et al. |

UNITED STATES PATENT AND TRADEMARK OFFICE
CERTIFICATE OF CORRECTION

PATENT NO. : 5,839,061
DATED : November 17, 1998
INVENTOR(S) : Hendrickson et al.

It is certified that error appears in the above-identified patent and that said Letters Patent is hereby corrected as shown below:

08/191,818    Method and Apparatus for    Hendrickson
              Improved Link Establishment and
              Monitoring in a Communications
              System All of the related applications are assigned to the asignee of the present invention, and are hereby incorporated herein in their entirety by this reference thereto.

Column 3,
Line 43, replace "block which" with -- block 30 which --

Signed and Sealed this

Fifteenth Day of January, 2002

Attest:

JAMES E. ROGAN
Attesting Officer    *Director of the United States Patent and Trademark Office*